United States Patent [19]

Leibach

[11] 4,037,409
[45] July 26, 1977

[54] GAS TURBINE ENGINE FOR VEHICLES

[75] Inventor: Heinrich Leibach, Grafrath-Wildenroth, Germany

[73] Assignee: Motoren- und Turbinen-Union Munchen GmbH, Munich, Germany

[21] Appl. No.: 663,072

[22] Filed: Mar. 2, 1976

[30] Foreign Application Priority Data

Mar. 6, 1975 Germany .............................. 2509670

[51] Int. Cl.² .............................................. F15B 1/02
[52] U.S. Cl. ....................................... 60/413; 60/414; 60/435; 60/437; 74/DIG. 5
[58] Field of Search ................. 60/330, 413, 414, 435, 60/437, 668, 698, 713, 39.16 R, 39.2, 39.24; 192/4 B; 74/DIG. 5; 180/44 F, 44 M

[56] References Cited

U.S. PATENT DOCUMENTS

| | | | |
|---|---|---|---|
| 3,533,493 | 10/1970 | Braun | 74/DIG. 5 |
| 3,597,998 | 8/1971 | Ebert | 60/437 X |

Primary Examiner—Edgar W. Geoghegan

[57] ABSTRACT

A gas turbine engine for vehicles in which an infinitely variable transmission in the form of a hydraulic transmission is coupled to the engine. A flywheel stores and releases braking energy, and has a disengageable coupling connecting the flywheel with the variable transmission to at least one wheel drive shaft. The hydraulic transmission has a pump unit and a motor unit which are hydraulically operable. The pump unit and motor unit are reversible for braking the vehicle, whereby the motor is driven by the wheels of the vehicle and operates as a pump, and the pump unit operates as a motor.

3 Claims, 1 Drawing Figure

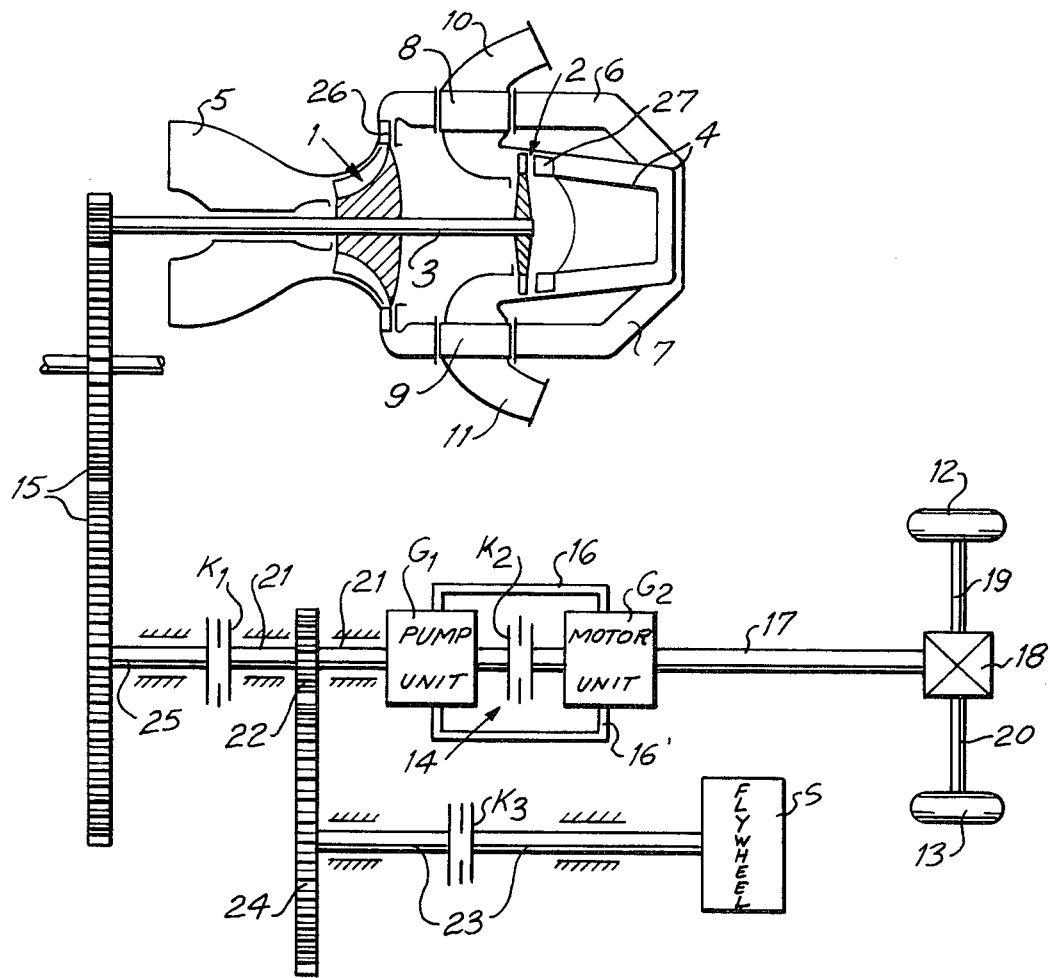

GAS TURBINE ENGINE FOR VEHICLES

The invention relates to a gas turbine engine for vehicles, whose essential feature is that it can be coupled via an infinitely variable transmission, e.g., a hydraulic transmission, with at least one wheel drive shaft.

As far as vehicles powered by gas turbine engines are concerned, e.g., trucks or locomotives, a basic principle in the interest of an economically operating drive system is to be able to maintain as high a cruising speed as possible. The economy of a gas turbine drive for vehicles will suffer if, in particular, the gas turbine engine has to operate predominantly in the partial-load range, as is the case, for example, in town traffic, or suburban traffic, and when travelling over hilly terrain.

For the above-mentioned reasons, the use of the gas turbine engine for vehicles will remain limited — for the time being at least — to mainly level stretches, such as are available to motor vehicles chiefly on fast highways or motorways.

Occasionally, however, even when it is used in this way, frequent changes between downhill and uphill stretches, maybe even prolonged stretches, have to be reckoned with.

Experience has shown that, when a gas-turbine-driven vehicle is used over the same stretch of highway, only a relatively insignificant raising of the attainable cruising speed requires a disproportionate power increase from the gas-turbine engine.

It is the aim of this invention to make, in comparison with what is familiar, a vehicle gas-turbine engine of the type mentioned above economically attractive with a view to varied driving service, while providing a capability of optimally storing the energy which has to be expended to brake the vehicle and of making this energy available, when needed, in a relatively simple manner as additional traction driving power.

Based on a vehicle gas-turbine engine with a hydraulic transmission or some other infinitely variable transmission, the invention to solve the problem posed has, as its chief characteristic feature, a flywheel for storing and releasing braking energy, which has a disengageable coupling connecting it with the infinitely variable transmission power train, e.g., hydraulic transmission power train, to the wheel drive.

In this way, at least a part of the power required to increase the vehicles's cruising speed can be supplied without having to resort to a disproportionately large rated power increase from the gas turbine engine.

For use in town or suburban traffic, the invention further offers the advantage of an especially good acceleration capability for the vehicle from a standstill or after braking.

An example of the invention, including further advantageous refinements, is explained with the aid of the diagram. The gas turbine engine shown in the schematic diagram features a radial compressor 1 as well as a compressor drive turbine 2 on the same engine shaft. Downstream from the compressor drive turbine 2, a pot-shaped reverse flow combustion chamber 4 is provided, via which the compressor drive turbine 2 is supplied with hot gas.

The radial compressor 1 sucks in ambient air through an intake duct 5 and conveys compressed air through ducts 6, 7 situated on both sides of the engine to the reverse flow combustion chamber 4. Before the compressed air reaches the reverse flow combustion chamber 4, it is pre-heated by recuperators 8, 9, which are built into the ducts 6, 7, the burnt gases from the compressor drive turbine 2 flowing through the recuperators 8, 9, which are in this instance substantially across the flowpath, before they are discharged to atmosphere through exhaust pipes 10, 11.

The power transfer from the gas turbine to the vehicle's wheels 12, 13 takes place via a reduction gear 15 between the engine shaft 3 (extended forwards) and a hydraulic transmission 14.

The hydraulic transmission 14 in this example consists of a pump unit $G_1$ which can supply fluid to hydraulically operate a motor unit $G_2$ via a line 16. The motor unit $G_2$ is positively connected to the vehicle's wheels 12, 13 by a propeller shaft 17, a differential gear 18 and the wheel drive shafts 19, 20.

Whenever a given speed is reached, the hydraulic transmission can be cut out and the power of the gas turbine engine can be transferred by engagement of clutch $K_2$ directly to the vehicle's wheels 12, 13.

The hydraulic transmission produces, in this instance, a rigid drive connection.

The diagram also shows a flywheel S which, from the moment the braking operation starts until the vehicle comes to a standstill, if this happens, is to be driven at a varying ratio via the hydraulic transmission 14 in such a manner that at the maximum speed possible of the flywheel S, the slowest possible driving speed can be achieved.

For this purpose, the hydraulic transmission 14 can be reversed so that the unit $G_2$, driven by the vehicle's wheels 12, 13, acts as a pump and the unit $G_1$, hydraulically actuated by it, acts as a motor, the clutch $K_2$ being disengaged.

The flywheel S in this example is driven by a gearwheel 22 on the input shaft 21 of the hydraulic transmission 14, this gearwheel meshing with another gearwheel 24 on the drive shaft 23 of the flywheel S, another clutch $K_3$ in the drive shaft 23 being engaged when it is driven.

A clutch $K_1$, connected between the output shaft 25 of the reduction gear 15 and the input shaft 21 of the hydraulic transmission 14, can be disengaged for the braking and energystoring process described, in order to be able to store as much as possible of the energy required for braking the vehicle in the flywheel S.

In the above case, it may be assumed that the gas turbine engine idles. On extremely steep inclines and for driving downhill at a constant speed, for instance, it may well be expedient to use the gas turbine engine for braking, the radial compressor 1 consuming power. In this case the clutch $K_1$ would have to be engaged.

After the braking operation or shortly before the vehicle comes to a halt, the clutches $K_1$, $K_2$ and $K_3$ are disengaged and the flywheel S rotates at maximum r.p.m.

As the diagram also shows, the gas turbine engine has, in the interest of an optimum adaptation of the performance characteristics to the driving conditions at any time, variable vanes 26 and 27 on the radial compressor 1 and compressor drive turbine 2 respectively.

The hydraulic transmission 14 or hydraulic variable transmission represented on the diagram can consist — for the pump unit $G_1$ and the motor unit $G_2$ — for instance of rotors rotatable around spin axes eccentric to the housing axes in each case. To start up, the pump rotor, for example, sucks oil from a tank after a check valve opens, this oil being fed under pressure through the line 16 to the housing of the motor unit $G_2$ to drive the motor unit ($G_2$) rotor. From the motor unit $G_2$, the oil flows back to the pump unit ($G_1$) housing through another line 16'. Changing the eccentricity of the pump rotor alters the delivery volume of the pump unit $G_1$ and, at a constant drive speed, the delivery rate as well. If the delivery rate is increased, the motor unit $G_2$ having constant absorption capacity, the speed of the motor rotor must increase.

When the vehicle is braked, the unit $G_2$ of the hydraulic transmission 14 acts as a pump, sucking oil out of the supply tank and feeding it under pressure into the housing $G_1$ via the line 16. As a result, the pump rotor carries out the function of a motor rotor.

Instead of the hydraulic transmission described above by way of example, some other infinitely variable transmission could be provided.

I claim:

1. Gas turbine engine for vehicles with at least one wheel drive shaft; an infinitely variable transmission for coupling said engine to said wheel drive shaft; a flywheel for storing and releasing braking energy; a disengageable coupling connecting said flywheel with said infinitely variable transmission to said wheel drive, said transmission comprising hydraulic transmission means having a pump unit and a motor unit operable hydraulically be said pump unit, said units being reversible for braking the vehicle, said motor unit being driven by the vehicle's wheels and operating as a pump, said pump unit operating as a motor and driving said flywheel when braking the vehicle, said flywheel being disengaged on the drive side, at the same time as the hydraulic transmission, from the gas-turbine engine by means of said clutch.

2. Gas turbine engine as defined in claim 1, including an auxiliary clutch between said pump unit and said motor unit.

3. Gas turbine engine as defined in claim 1, including a reduction gear between the engine shaft and said hydraulic transmission.

* * * * *